United States Patent
Wang et al.

(10) Patent No.: US 12,260,147 B2
(45) Date of Patent: Mar. 25, 2025

(54) DISPLAY CONTROL METHOD, DISPLAY APPARATUS

(71) Applicant: Lenovo (Beijing) Limited, Beijing (CN)

(72) Inventors: Hongyu Wang, Beijing (CN); Weiqiang Fang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/978,564

(22) Filed: Nov. 1, 2022

(65) Prior Publication Data

US 2023/0136873 A1 May 4, 2023

(30) Foreign Application Priority Data

Nov. 1, 2021 (CN) .......................... 202111284581.2

(51) Int. Cl.
*G06F 3/14* (2006.01)
*G06F 3/147* (2006.01)
*G06F 3/0482* (2013.01)

(52) U.S. Cl.
CPC ............ *G06F 3/1431* (2013.01); *G06F 3/147* (2013.01); *G06F 3/0482* (2013.01)

(58) Field of Classification Search
CPC ...... G06F 3/1431; G06F 3/147; G06F 3/0482; G06F 3/14; G09G 5/00
See application file for complete search history.

(56) References Cited

U.S. PATENT DOCUMENTS

| | | | |
|---|---|---|---|
| 10,551,987 B2* | 2/2020 | Chae | G06F 3/04883 |
| 2002/0089518 A1* | 7/2002 | Shigeta | G06F 3/14 |
| | | | 715/790 |
| 2014/0211426 A1* | 7/2014 | Chen | G09G 5/006 |
| | | | 361/748 |
| 2019/0212877 A1* | 7/2019 | Sipko | G06F 3/1446 |
| 2020/0042274 A1* | 2/2020 | Park | G09G 5/12 |
| 2021/0041960 A1* | 2/2021 | Kim | G06F 3/04812 |
| 2021/0287593 A1* | 9/2021 | Baek | G09G 3/007 |

* cited by examiner

*Primary Examiner* — Matthew A Eason
*Assistant Examiner* — Sujit Shah
(74) *Attorney, Agent, or Firm* — ANOVA LAW GROUP, PLLC

(57) ABSTRACT

A display control method includes obtaining an image signal from an electronic apparatus. The image signal includes at least a first image signal and a second image signal. The first image signal corresponds to first configuration information, the second image signal corresponds to second configuration information. The first configuration information and the second configuration information are used to enable the electronic apparatus to determine two different display areas. The display control method further includes determining a current display mode of a first display apparatus, when the current display mode is a first display mode, controlling the first image signal to be output and displayed on the first display apparatus corresponding to the first configuration information and controlling the second image signal to be output and displayed on a second display apparatus connected to the first display apparatus and corresponding to the second configuration information.

20 Claims, 6 Drawing Sheets

DISPLAY CONTROL METHOD, DISPLAY APPARATUS

CROSS-REFERENCE TO RELATED APPLICATION

This application claims priority to Chinese Patent Application No. 202111284581.2, filed on Nov. 1, 2021, the entire content of which is incorporated herein by reference.

TECHNICAL FIELD

The present disclosure relates to the control technology field and, more particularly, to a display control method and a display apparatus.

BACKGROUND

To improve efficiency in offices or in an education setting, a scene in which a plurality of screens are used to display contents of different signal sources is often required. However, the current display apparatus cannot satisfy increasingly diverse display requirements of the user.

SUMMARY

Embodiments of the present disclosure provide a display control method. The method includes obtaining an image signal from an electronic apparatus. The image signal includes at least a first image signal and a second image signal. The first image signal corresponds to first configuration information, the second image signal corresponds to second configuration information. The first configuration information and the second configuration information are used to enable the electronic apparatus to determine two different display areas. The display control method further includes determining a current display mode of a first display apparatus, when the current display mode is a first display mode, controlling the first image signal to be output and displayed on the first display apparatus corresponding to the first configuration information and controlling the second image signal to be output and displayed on a second display apparatus connected to the first display apparatus and corresponding to the second configuration information, and when the current display mode is a second display mode, controlling the first image signal and the second image signal to be output and displayed in the two different display areas of the first display apparatus, respectively, the two different display areas corresponding to the first configuration information and the second configuration information, respectively.

Embodiments of the present disclosure provide a display apparatus, including a memory and a processor. The memory stores a program. The processor is coupled to the memory and, when the program is executed, configured to obtain an image signal from an electronic apparatus. The image signal includes at least a first image signal and a second image signal. The first image signal corresponds to first configuration information, the second image signal corresponds to second configuration information. The first configuration information and the second configuration information are used to enable the electronic apparatus to determine two different display areas. The processor is further configured to determine a current display mode of a first display apparatus, when the current display mode is a first display mode, control the first image signal to be output and displayed on the first display apparatus corresponding to the first configuration information and control the second image signal to be output and displayed on a second display apparatus connected to the first display apparatus and corresponding to the second configuration information, and when the current display mode is a second display mode, control the first image signal and the second image signal to be output and displayed in the two different display areas of the first display apparatus, respectively, the two different display areas corresponding to the first configuration information and the second configuration information, respectively.

Embodiments of the present disclosure provide a non-transitory computer-readable storage medium. The storage medium stores a program that, when the program is executed, causes the processor to obtain an image signal from an electronic apparatus. The image signal includes at least a first image signal and a second image signal. The first image signal corresponds to first configuration information, the second image signal corresponds to second configuration information. The first configuration information and the second configuration information are used to enable the electronic apparatus to determine two different display areas. The processor is further configured to determine a current display mode of a first display apparatus, when the current display mode is a first display mode, control the first image signal to be output and displayed on the first display apparatus corresponding to the first configuration information and control the second image signal to be output and displayed on a second display apparatus connected to the first display apparatus and corresponding to the second configuration information, and when the current display mode is a second display mode, control the first image signal and the second image signal to be output and displayed in the two different display areas of the first display apparatus, respectively, the two different display areas corresponding to the first configuration information and the second configuration information, respectively.

DETAILED DESCRIPTION OF THE EMBODIMENTS

The technical solutions in embodiments of the present disclosure will be described in detail below with reference to the drawings in the embodiments of the present disclosure. Apparently, the described embodiments are only some embodiments of the present disclosure, not all embodiments. Based on embodiments of the present disclosure, all other embodiments obtained by those of ordinary skill in the art without creative efforts shall be within the scope of the present disclosure.

Embodiments of the present disclosure may be applied to a display apparatus. The present disclosure does not limit a product form of the display apparatus. The display apparatus may be not limited to an individual display, a display device of a smart apparatus, which can be selected depending on requirements.

Figure 1:
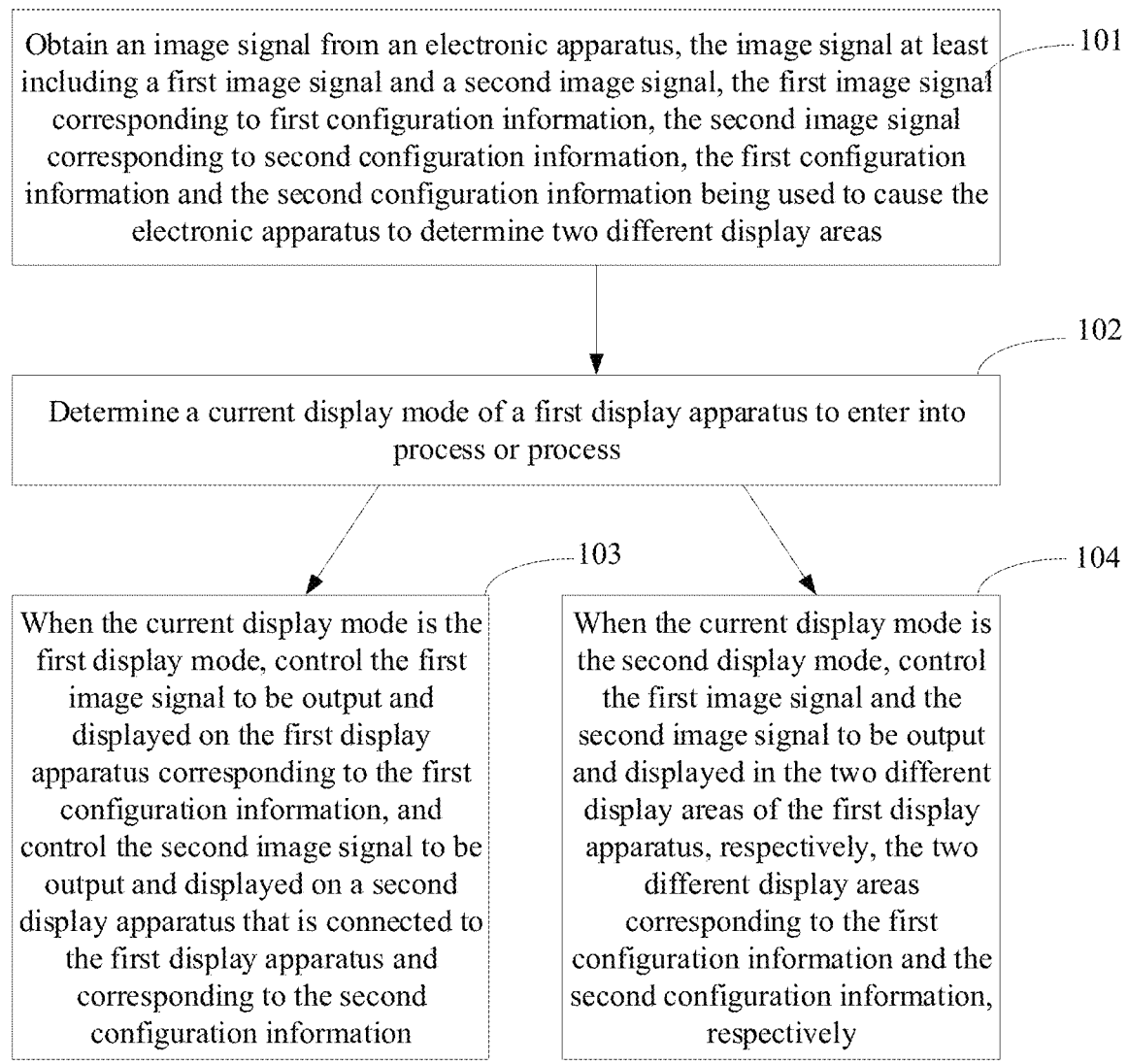
FIG. 1 illustrates a schematic flowchart of a display control method according to embodiments of the present disclosure.

FIG. 1 illustrates a schematic flowchart of a display control method according to embodiments of the present disclosure. The display control method may be applied to a display apparatus with an autonomous display processing function. As shown in FIG. 1, the display control method includes the following processes.

At 101, an image signal is obtained from an electronic apparatus. The image signal at least includes a first image signal and a second image signal. The first image signal corresponds to first configuration information. The second image signal corresponds to second configuration information. The first configuration information and the second configuration information are used to cause the electronic apparatus to determine two different display areas.

The electronic device may include a smartphone, a tablet computer, a wearable device, a personal computer, a netbook, etc., which is not limited by the present disclosure. In some embodiments, the electronic apparatus may be an electronic apparatus with a display device or an electronic device without a display device, as long as the electronic apparatus can output a display signal in a wired or wireless manner.

The image signal may be an image signal obtained by processing based on the received configuration information after a graphics card of the electronic apparatus obtains the configuration information of the display area. The configuration information may be extended display identification data (EDID) and include display identification data. In some embodiments, the content of the configuration information may include but is not limited to, a resolution, a refresh rate, and an area identifier of the display area. In embodiments of the present disclosure, the configuration information may at least include the first configuration information and the second configuration information, which indicate two different display areas. The two different display areas may perform control and display on an independent image signal. Therefore, based on at least the first configuration information and the second configuration information, the graphics card of the electronic apparatus may be configured to process and generate two image signals for independent display in the two different display areas, that is, the first image signal and the second image signal.

The two different display areas indicated by the first configuration information and the second configuration information may be display areas of different display devices or may be display areas of a same display device. For example, the display screen may be divided into left and right display areas. The left display area and the right display area may display different signal sources. Both the first configuration information and the second configuration information may be sent by an execution body of the display control method of the present disclosure to the graphics card of the electronic apparatus. The graphics card may be configured to only determine two different display areas based on the first configuration information and the second configuration information. The graphics card may be configured to process and generate two image signals corresponding to the different display areas. Whether the two different display areas may correspond to two image signals of different display areas. Whether the two different display areas correspond to two display apparatuses or on a same display apparatus, which is not indicated by the display card.

The first image signal and the second image signal may be a same image signal or different image signals, which may be controlled and processed based on actual needs of the user.

At 102, a current display mode of a first display apparatus is determined to enter into process 103 or process 104.

In different display modes, the display processing logic of the display control method may also be different. Therefore, before performing an image signal display task, a display mode of the current apparatus may be determined first. The display mode may be determined but is not limited to first determining the display mode of the current device. Determination of the display mode may be, but is not limited to, determined based on a flag bit inside the system to indicate the display mode and determined when a user triggers a selection signal or based on some detection signals.

At 103, when the current display mode is the first display mode, the first image signal is controlled to be output and displayed on the first display apparatus corresponding to the first configuration information, and the second image signal is controlled to be output and displayed on a second display apparatus that is connected to the first display apparatus and corresponding to the second configuration information.

Figure 2:
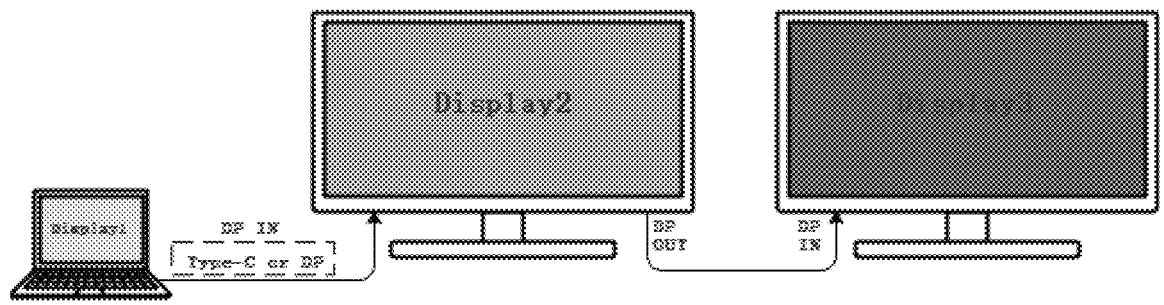
FIG. 2 illustrates a schematic diagram showing a display apparatus connection relationship of a daisy chain realization scenario according to embodiments of the present disclosure.

In the first display mode, the different display areas above may be located on different display apparatuses, which may be implemented in a daisy chain form. A daisy chain may be used to connect a plurality of monitors in series with each other to a single interface. FIG. 2 illustrates the implementation of the daisy chain. The notebook computer and two monitors are connected in series. Different image contents may be displayed on different monitors. The notebook computer with the display device (Display 1) may be the electronic apparatus of embodiments of the present disclosure. A display (Display 2) may be an execution subject of the display control method of the present disclosure, that is, the first display apparatus. A display (Display 3) may be the second display apparatus. Of course, FIG. 2 is only a simple example of daisy chain implementation. In practical applications, after Display 3, Display 4 and Display 5 may be connected in series.

In some embodiments, after the first display apparatus receives an image signal, the first display apparatus may only perform restoration and parsing processing on the first image signal, and locally outputs and displays an image content obtained through the parsing processing. The second image signal may be transmitted to the second display apparatus connected to the first display apparatus, second display apparatus. After receiving the second image signal, the second display apparatus may perform restoration and parsing processing on the second image signal and outputs and displays an image content obtained through the restoration and parsing processing locally.

When the image signal obtained from the electronic apparatus also includes a third image signal or even a fourth image signal, a third display apparatus and a fourth display apparatus may be connected in series after the second display apparatus. Thus, the image signal received by the second display apparatus may not only include the second image signal but also include the third image signal and the fourth image signal. In this scenario, the second display apparatus may only perform restoration and parsing on the second image signal that needs to be processed and displayed by the second display apparatus, and then outputs the obtained image content display. The second display apparatus may not perform any processing on the third image signal and the fourth image signal. The third image signal and the fourth image signal may be directly transmitted to the third display apparatus. The other display apparatuses connected in series may have similar processing as the second display apparatus and only perform restoration and parsing processing on the image signal to obtain the display content that needs to be output locally. Other image signals that are not related may be transmitted to a next display apparatus.

At 104, when the current display mode is the second display mode, the first image signal and the second image signal are controlled to be output and displayed in the two different display areas of the first display apparatus, respectively. The two different display areas correspond to the first configuration information and the second configuration information, respectively.

In the second display mode, the different display areas above may be located on the same display apparatus. Displaying the first image signal and the second image signal on the first display apparatus may have different implementations. For example, two display areas corresponding to the first image signal and the second image signal may be arranged in a neighboring manner such as left and right, up and down, etc. In some other embodiments, the two display areas may also be presented in a form of a surround split screen in a form of picture-in-picture. An arrangement of the two display areas may not be limited in the present disclosure. When the two display areas corresponding to the first image signal and the second image signal are presented in the form of picture-in-picture, a surrounding display area and a surrounded display area are two completely independent display areas without overlapping and shielding.

Figure 3:
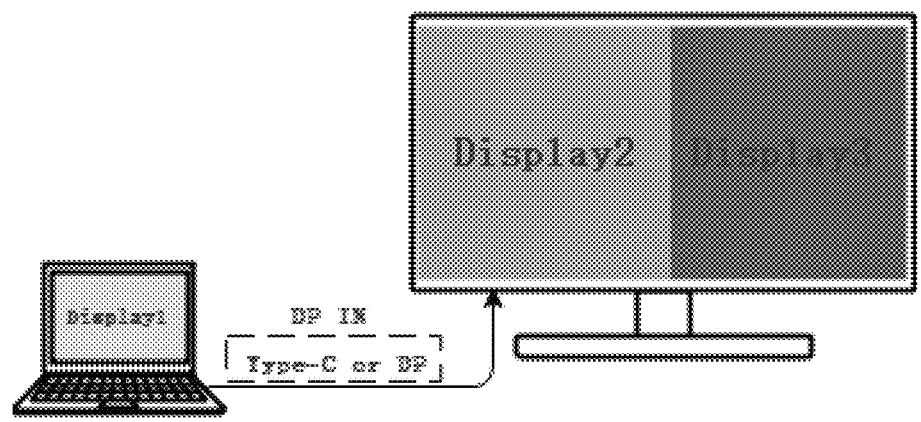
FIG. 3 illustrates a schematic diagram showing two display areas by dividing a display screen according to embodiments of the present disclosure.

In the second display mode, the display screen of the first display apparatus may be divided into at least two displays from a physical perspective. FIG. 3 illustrates an exemplary diagram of dividing one display screen into two display areas. The first display area may be used to display the first image signal, and the second display area may be used to display the second image signal. The display contents of the two display areas may be configured independently, and the display processes of the two display areas may not interfere with each other.

In the display control method of embodiments of the present disclosure, two display modes may be implemented on the first display apparatus. When enough display apparatuses exist in an application environment, the first display apparatus may control different image signals to be displayed on different display apparatuses respectively. When display apparatuses are not enough in the application environment, and a plurality of image signals need to be displayed, the first display apparatus may divide the display screen of the first display apparatus into different display areas to display different image signals, respectively. In the implementation, the display control function of the first display apparatus may be more complete and have a wider application range to better satisfy the diverse usage needs of the user.

Before the display control method of embodiments of the present disclosure is formally implemented, the first display apparatus may need to send configuration information of the display areas to the graphics card of the electronic apparatus. Thus, the graphics card may be configured to process based on the configuration information to obtain corresponding image signals.

In some embodiments, before entering the first display mode, the first display apparatus may send the first configuration information of the first display apparatus and the second configuration information of the second display apparatus connected to the first display apparatus to the electronic apparatus. The first configuration information may include display parameter information of the first display apparatus, and the second configuration information may include display parameter information of the second display apparatus.

As shown in FIG. 2, the first display apparatus is directly connected to the notebook computer, while the second display apparatus is not directly connected to the notebook computer. Thus, the second display apparatus can only communicate with the notebook computer through the first display apparatus. In some embodiments, during sending the configuration information to the notebook computer, after the first display apparatus establishes a connection to the notebook computer, the first display apparatus may first send the first configuration information to the notebook computer. Then, after receiving the second configuration information sent by the second display apparatus, the first display apparatus may forward the second configuration information to the notebook computer. Thus, after the notebook computer receives the configuration information corresponding to the first display apparatus and the second display apparatus, the notebook computer may process to obtain two image signals.

In some other embodiments, after the first display apparatus establishes the connection to the notebook computer, the first display apparatus may not send the first configuration information to the notebook computer separately. After receiving the second configuration information sent by the second display apparatus that is connected in series, the first display apparatus may gather the configuration information corresponding to the different display apparatuses and send the configuration information to the notebook computer.

Before entering the second display mode, the first display apparatus may create the first configuration information and the second configuration information and send the first configuration information and the second configuration information to the electronic apparatus. The first configuration information may include display parameter information of the first display area of the first display apparatus, and the second configuration information may include display parameter information of the second display area of the first display apparatus.

In the second display mode, although the first configuration information and the second configuration information corresponding to the two display areas exist, respectively, two independent display apparatuses may not exist. Thus, the first configuration information and the second configuration information may be created by the first display apparatus. That is, the first display apparatus may simulate the display screen into two independent displays and send the display parameter information of the two independent displays to the electronic apparatus. The electronic apparatus may only determine whether a plurality of image signals need to be processed through the configuration information sent by the first display apparatus and may not pay attention to whether a plurality of display apparatuses exist in an actual situation.

Before entering the first display mode or the second display mode, sending the first configuration information and the second configuration information to the electronic apparatus may have various implementation forms. For example, in some embodiments, after the electronic apparatus is connected to the first display apparatus, the first display apparatus may send the first configuration information and the second configuration information to the electronic apparatus immediately to ensure the two pieces of the configuration information may be available for the electronic apparatus any time. In some other embodiments, based on the actual situation, after the first display apparatus receives an instruction of performing processing on the plurality of image signals, the first display apparatus may send the first configuration information and the second configuration information sent to the electronic apparatus. In other embodiments, after the electronic apparatus is connected to the first display apparatus, the first display apparatus may send the first configuration information and the second configuration information to the electronic apparatus at any time. For example, when the first display apparatus detects that the second display apparatus is connected, it indicates that the user needs to perform multi-screen display. Based on a trigger condition that the second display apparatus is connected, the first configuration information and the second configuration information may be sent to the electronic apparatus. In some embodiments, the configuration information may be sent without the trigger condition. For example, after the electronic apparatus is connected to the first display apparatus for a first time period, the first configuration information and the second configuration information are sent. In this situation, handshake interaction of other basic information may need to be considered at the beginning when the electronic apparatus is connected to the first display apparatus. After the handshake interaction of the basic information, the configuration information may be sent. Thus, the pressure for data processing at the beginning when the connection is established may be dispersed.

In some embodiments, in the first display mode or the second display mode, the second image signal may be sent to a switch device through a data protocol corresponding to the first display mode. The data protocol corresponding to the first display mode may be a DisplayPort (DP) communication protocol.

Figure 4:
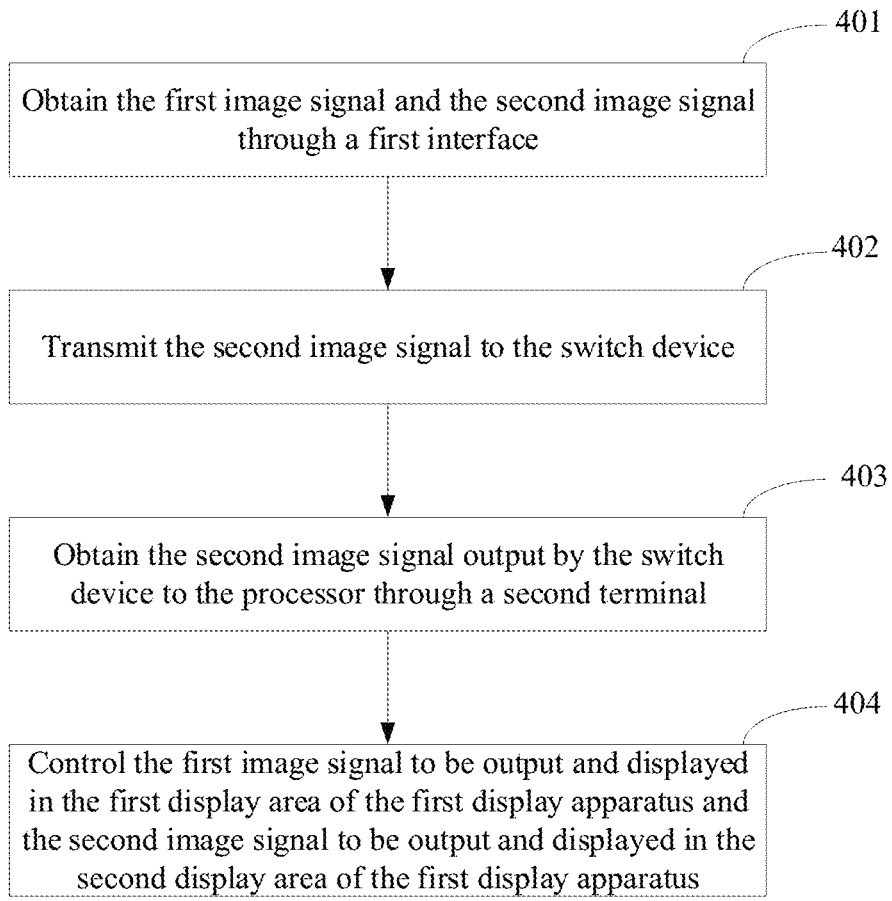
FIG. 4 illustrates a schematic flowchart showing display control in a second display mode according to embodiments of the present disclosure.

FIG. 4 illustrates a schematic flowchart showing display control in a second display mode according to embodiments of the present disclosure. As shown in FIG. 4, controlling the first image signal and the second image signal to be displayed in the two different display areas of the first display apparatus, respectively includes the following processes.

At 401, a processor obtains the first image signal and the second image signal through a first interface.

The first interface may be an interface connected to the electronic apparatus. The first interface may be a DisplayPort interface, a USB Type-C interface, or other interfaces supporting image signal transmission, which is not limited by the present disclosure.

At 402, the processor transmits the second image signal to the switch device.

The switch device may be configured to switch between different communication lines. Different communication lines may transmit the second image signal to different apparatuses or devices. In some embodiments, the communication lines that can be communicated by the switch device may include two lines, including a line connected to the second display apparatus and a line connected to the processor.

Since in the second display mode, both the first image signal and the second image signal are output and displayed on the first display apparatus, in the second display mode, the switch device may connect the line connected to the processor to transmit the second image signal to the processor.

At 403, the processor obtains the second image signal output by the switch device to the processor through a second terminal.

Same as the first display mode, in the second display mode, the processor may still retain the first image signal and transmit the second image signal to the switch device. A difference is that, in the second display mode, a target location to which the second image signal is transmitted may be still the processor. An implementation process may include transmitting the second image signal from the switch device to an input terminal of the processor connected to the switch device, i.e., the second terminal, to transmit the second image signal back.

In some embodiments, the switch device may have a line connection relationship with the second terminal. The switch device may transmit the second image signal to the processor through the second terminal. The second terminal may be different from the first terminal. The first terminal may be an input terminal of the processor, which is connected to the first interface arranged on the housing of the first display apparatus.

At 404, the processor controls the first image signal to be output and displayed in the first display area of the first display apparatus and the second image signal to be output and displayed in the second display area of the first display apparatus.

In some embodiments, the first display apparatus may splice image frames of the first image corresponding to the first image signal and image frames of the second image corresponding to the second image signal according to the arrangement of the two display areas. Then, the first display apparatus may output and display a spliced image obtained by splicing on the display screen of the first display apparatus. Thus, the display screen of the first display apparatus may display contents of two signals in different areas.

In some other embodiments, the first display apparatus may directly perform processing and display on the first image signal. The second image signal may need to be sent to the switch device and then sent back to the processor by the switch device. Then, the second image signal may be processed and displayed. Thus, the display of the second image signal on the first display apparatus may have a certain delay compared to the display of the first image signal on the first display apparatus. To ensure synchronization of time when the first image signal and the second image signal are output on the first display apparatus, delayed time of the display of the second image signal on the first display apparatus compared to the display of the first image signal on the first display apparatus may be determined through some test. Then, the output time of the first image signal may be delayed for a time period, which is the delayed time, to ensure the synchronization of the time when the first image signal and the second image signal are output.

In some other embodiments, the image signal may further include a third image signal. The display control method may further include, when the current display mode is a third display mode, controlling the first image signal and the second image signal to be output and displayed in the two different display areas of the first display apparatus and controlling the third image signal to be output and displayed on the second display apparatus.

Figure 5:
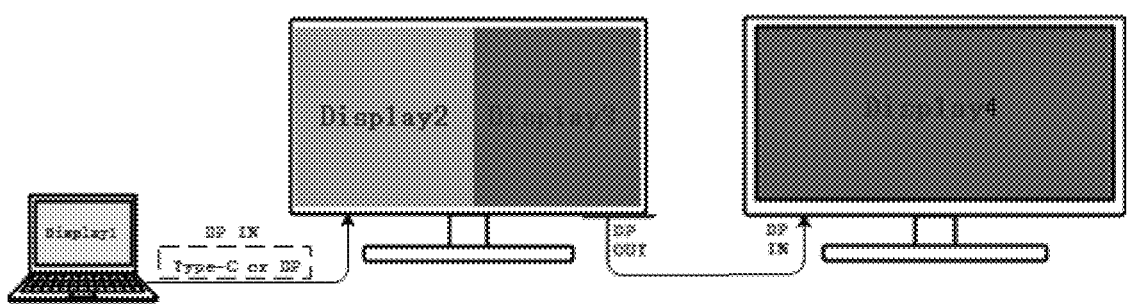
FIG. 5 illustrates a schematic diagram showing a distribution of a display area in a third display mode according to embodiments of the present disclosure.

In the third display mode, the first display apparatus may be a divided screen display, and the first display apparatus and the second display apparatus may be implemented in the daisy chain technology. FIG. 5 illustrates an exemplary diagram of a distribution of display areas in the third display mode according to embodiments of the present disclosure. The third display mode may be understood with reference to FIG. 5.

In the third display mode, the configuration information sent by the first display apparatus to the electronic apparatus may include at least third configuration information in addition to the first configuration information and the second configuration information. Thus, the image signal received by the first display apparatus may at least include the third image signal in addition to the first image signal and the second image signal. The first display apparatus performs parsing and restoration on the first image signal and control the content of the first image signal to be displayed in the left half display area of the first display apparatus in FIG. 5. Meanwhile, the first display apparatus may send the second image signal and the third image signal to the switch device. The switch device may transmit the second image signal back to the processor. Thus, the content of the second image signal is displayed in the display area on the right half of the first display apparatus in FIG. 5. The switch device may also transmit the third image signal to the second display apparatus. Thus, the content of the third image signal may be displayed in the display area of the second display apparatus. In this example, description is made by only taking three image signals an example. In practical applications, the image signals received by the first display apparatus may also include more image signals. Each connected display apparatus may only implement the daisy-chain function or implement a hard split screen function and the daisy-chain function simultaneously.

Based on the above content, controlling the first image signal and the second image signal to be output and displayed in two different display areas of the first display apparatus respectively, and controlling the third image signal to be displayed in the second display apparatus may include obtaining the first image signal, the second image signal, and the third image signal through the first interface by the processor, transmitting the second image signal and the third image signal to the switch device by the processor, obtaining the second image signal output to the processor by the switch device through second terminal by the processor, controlling the switch device to transmit the third image signal to the second display apparatus for output and display, and controlling the first image signal to be output and displayed in the first display area of the first display apparatus and the second image signal to be output and displayed in the second display area of the first display apparatus.

In the third display mode, the switch device may need to transmit the second image signal back to the processor and also need to transmit the third image signal to the second display apparatus, which is implemented as follows. The switch device may include a first switch device and a second switch device. The second image signal may be transmitted back to the processor through the first switch device, and the third image signal may be transmitted to the second display apparatus through the second switch device. In some other embodiments, the switch device may be controlled by a time-dividing control technology to implement a switching operation at a relatively high frequency to ensure to transmit the second image signal back to the processor and transmit the third image signal to the second display apparatus.

The switching of the display modes described above may only include the switching of the first display mode, the second display mode, and the third display mode. In practical applications, the switching from a fourth display mode to the first display mode or the second display mode may also be realized. The fourth display mode may be a conventional display mode. That is, the fourth display mode may be a mode in which the plurality of image signals do not need to be processed, and only one image signal of the electronic apparatus may be received, parsed, and output. The switching from the fourth display mode to the first display mode, the second display mode, or the third display mode may be implemented by modifying the configuration information or by triggering by a hotkey.

For example, in an application scenario in which only the first display apparatus is included, the first display apparatus may establish a connection with the electronic apparatus. Only the configuration information representing one display area may be sent, and one image signal may be received subsequently. Parsing may be performed on the only image signal for output and display, which corresponds to the fourth display mode. After the user triggers and starts the second display mode, the first display apparatus may enter the second display mode to receive two image signals. The first display apparatus may control the contents of the two image signals to be output and displayed on the first display apparatus. Then, the user may trigger to exist the second display mode. Thus, the first display apparatus may return to the fourth display mode.

For another example, in a scenario including the first display apparatus and the second display apparatus, if the first display apparatus is in the second display mode in an original operation state, that is, the first display device may display the display contents of the two image signals in different areas, the second display apparatus may have no display content. The user may subsequently trigger to close the second display mode. Since the two image signals need to be processed and displayed, when the system determines that the second display apparatus is available, the system may automatically switch to the first display mode. That is, the first display apparatus may process and display one image signal, and the second display apparatus may process and display the other image signal.

In other embodiments, the display control method may further include receiving a switch signal and controlling the first display apparatus to switch from the first display mode to the second display mode based on the switch signal or from the second display mode to the first display mode. The switch signal may be generated by an input device of the first display apparatus or may be generated by the first display apparatus automatically when detecting a first condition.

The user can switch the display mode through manual control. For example, the user may trigger to call up a screen display menu and select the displayed content in the screen display menu to select and switch the display mode. For example, a list of names of all display modes may be displayed in the screen display menu. The user may select the second display mode by clicking a mouse or directly touching and clicking the second display mode through the touch screen. Then, the mouse or touch screen may generate an input signal. The input signal may be the switch signal. That is, the switch signal may be generated by an input device (a mouse, a touch screen, etc.). In some other embodiments, the switch signal may be generated without calling up the screen display menu. The user may operate a predetermined button based on a predetermined instruction to trigger the switching to enter the corresponding display mode. For example, the predetermined button may be long pressed for 5 s to cause the first display apparatus to automatically switch to the second display mode. Thus, the switch signal may be triggered and generated by the input device (the predetermined button).

When the first display apparatus is in the second display mode, if the second display apparatus is detected to be connected, the first condition may be determined to be satisfied. The first display apparatus may be controlled to be switched from the second display mode to the first display mode.

When the first display apparatus is in the second display mode, both the first image signal and the second image signal may be output and displayed on the first display apparatus. Thus, if the first display apparatus detects that the second display apparatus is connected, it may indicate that the user wants to display the first image signal and the second image signal on two independent display apparatuses. Thus, the first condition may be determined to be satisfied. The first display apparatus may be automatically controlled to be switched from the second display mode to the first display mode. Thus, the second image signal may be transmitted to the second display apparatus for output and display.

In some embodiments, controlling to switch from the second display mode to the first display mode may include controlling the first image signal to be output and displayed on the first display apparatus by the processor and transmitting the second image signal to the switch device by the processor. Thus, the switch device may transmit the second image signal to the second display apparatus for output and display.

In addition, in some embodiments, when the first display apparatus is in the first display mode, if the connection to the second display apparatus is detected to be interrupted, the first condition may be determined to be satisfied. The first display apparatus may be controlled to be switched from the first display mode to the second display mode.

When the first display apparatus is in the first display mode, the first image signal may be output and displayed on the first display apparatus, and the second image signal may be output and displayed on the second display apparatus. Thus, if the first display apparatus detects that the connection with the second display apparatus is disconnected, it may indicate that the user wants to display both the first image signal and the second image signal on the first display apparatus. Thus, the first condition may be determined to be satisfied, the first display apparatus may be automatically controlled to be switched from the first display mode to the second display mode. Thus, the second image signal and the first image signal may be output and displayed on the first display apparatus.

In some embodiments, the first image signal may be parsed into a first image, and the second image signal may be parsed into a second image. Generating a switch signal by the input device of the display apparatus may include displaying a fourth image on the first display apparatus and generating the switch signal based on a selection signal of the input device for the display content of the fourth image. The first image and the second image may be obtained by parsing the first image signal and the second image signal by the first display apparatus. The fourth image may be generated by the first display apparatus locally. A second manner of outputting the fourth image may be different from a first manner of outputting the first image and the second image. A display priority of the second manner may be higher than a display priority of the first manner. Thus, when the fourth image is overlapped with the first image and/or the second image for display, the fourth image may shield or affect the first image and/or the second image.

The second manner of outputting and displaying the fourth image may be different from the first manner of restoring and parsing the first image signal for output and display. In some embodiments, the fourth image may be an on-screen display (OSD) image, which is generated or read by an operating system of the first display apparatus. The user may trigger through the OSD to generate the switch signal. The display priority of the OSD image may be higher than the display priority of the image signal. In some embodiments, the OSD image may be represented in a translucent manner or in a manner of shielding a corresponding content of the image signal.

Figure 6:
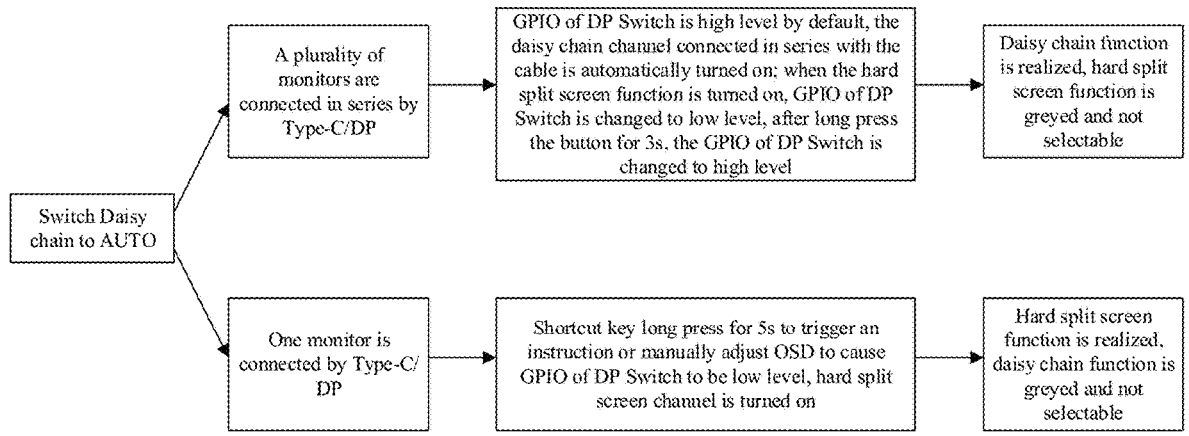
FIG. 6 illustrates a schematic flowchart of mode switch control according to embodiments of the present disclosure.
Figure 7:
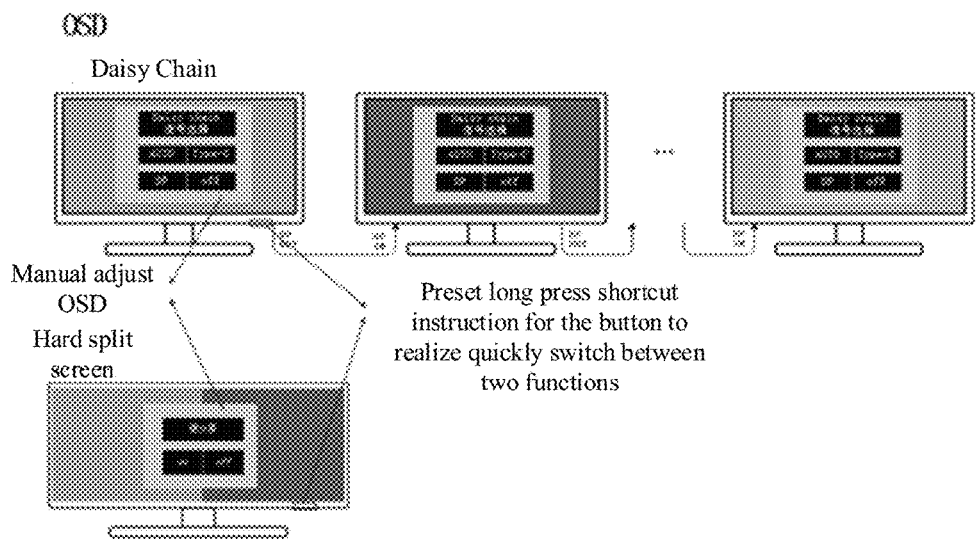
FIG. 7 illustrates a schematic diagram showing an implementation of mode switch according to embodiments of the present disclosure.

In addition to the above manner of OSD triggering to generate the switch signal, the display mode may be switched in other manners. For example, the switch signal may be triggered and generated by the hotkey. To better understand the present disclosure, an example may be described in connection with FIG. 6 and FIG. 7. FIG. 6 illustrates a schematic flowchart of mode switch control according to embodiments of the present disclosure. FIG. 7 illustrates a schematic diagram showing an implementation of mode switch according to embodiments of the present disclosure. As shown in FIG. 6 and FIG. 7, the first display mode corresponds to the daisy chain function, and the second display mode corresponds to the hard split screen function (displaying different signal sources in different areas on one display). The switch device DP Switch may use a general-purpose input/output (GPIO) signal to achieve switching control. In some embodiments, the daisy chain function and hard split screen function may be realized by controlling the high and low levels of the GPIO. When the GPIO is high, the daisy chain function may be set to a default state.

As shown in FIG. 6, since the GPIO of the DP Switch is preset to a high level, when the plurality of display apparatuses are connected in series with a DP cable, the daisy chain function is automatically realized. Thus, a special instruction for the button hotkey may be preset in the processor. When a long-press 5$s$ trigger instruction is set for the button, after the user triggers the instruction, the GPIO may be pulled to a low level from the high level to realize the hard split-screen function. When a long-press 3$s$ trigger instruction is set for the button, after the user triggers the instruction, the GPIO may be restored to the default high level to realize the daisy chain function.

Referring to FIG. 7, whether in the daisy-chain implementation or the hard split-screen implementation, the display mode is switched through the OSD screen menu. Since the first display mode corresponding to the daisy chain is the default mode, in the OSD screen menu, the daisy chain function may be turned off by pressing the off button. In the first display mode corresponding to the daisy chain, contents and layouts of the OSD screen menus of the plurality of display apparatuses that are connected in series may be same. In the second display mode corresponding to the hard split screen, the OSD screen menu may include an on-button of controlling the hard screen split function to be turned on and an off button of controlling the hard split screen function to turn off. Thus, on and off of the hard split screen function may be controlled based on the two buttons.

In addition, the display apparatus may also include a hotkey, that is, a key identified by a box in FIG. 7. A shortcut instruction of a button long press may be preset in the system. The user may quickly switch between two implementation functions by long pressing the hotkey, that is, the daisy chain function and the hard split screen function.

The switching of different display modes of embodiments of the present disclosure may not only include on/off of a certain display mode but also include the switching between the different display modes.

In the above content, after entering the first display mode, the second display mode, and the third display mode, how the first display apparatus controls the parsing, restoration, and output and display of the image signal may be described. The first display mode, the second display mode, and the third display mode may be turned on and off by manually adjusting the OSD on-screen menu. As shown in FIG. 7, the corresponding display mode may be controlled to be on or off through the on-button or off button in the screen menu. After a certain display mode is turned on by triggering the on-button in the screen menu, if the display mode is exited by triggering the off-button in the screen menu, the first display apparatus may return to the display mode or operation state before entering the display mode, which is not limited in the present disclosure.

Thus, in one display mode, switching from one display mode to another display mode may be triggered manually or automatically. For example, the hotkey may be manually triggered. The display mode may be switched to a corresponding display mode implementation by long-pressing the hotkey.

To simplify the description, method embodiments may be described as a series of action combinations. However, those skilled in the art should know that the present disclosure is not limited by the described action sequence. According to the present disclosure, certain processes may be performed in another sequence or simultaneously. In addition, those skilled in the art should also know that embodiments described in the specification may be some embodiments. The actions and modules related to method embodiments may not be necessarily in the present disclosure.

The method is described in detail in embodiments of the present disclosure. The method of the present disclosure may be implemented using a plurality of forms of apparatuses. Thus, embodiments of the present disclosure may further provide a display apparatus, which is described in detail in embodiments of the present disclosure.

Figure 8:
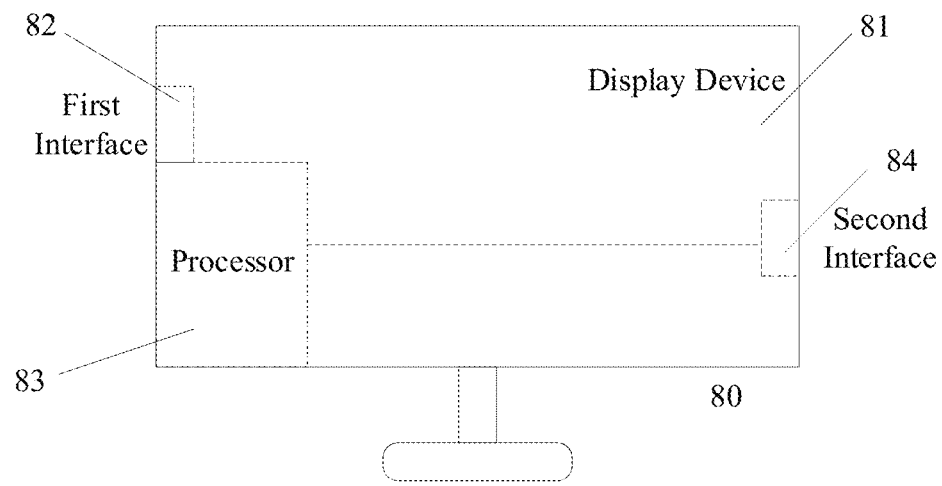
FIG. 8 illustrates a schematic structural diagram of a display apparatus according to embodiments of the present disclosure.

FIG. 8 illustrates a schematic structural diagram of a display apparatus according to embodiments of the present disclosure. Since the display apparatus, the processor, and the first interface may block each other in actual situations, the processor and the first interface may be shown with dotted lines in FIG. 8. Referring to FIG. 8, the display apparatus 80 includes a display device 81, a first interface 82, a processor 83, a second interface 84.

The display device 81 may be configured to display an image.

The first interface 82 may be configured to be connected to an electronic apparatus and obtain the image signal from the electronic apparatus. The image signal may at least include the first image signal and the second image signal that are displayed in the different display areas. The first interface 82 may be a DP interface, a USB type-C, or another interface that supports image signal transmission.

The processor 83 may be configured to, in the first display mode, control the first image signal to be output and displayed on the display device 71 and control the second image signal to be output and displayed on another display apparatus connected to the display apparatus. The processor 83 may be further configured to, in the second display mode, control the first image signal and the second image signal to be output and displayed in two different display areas of the display device 81, respectively.

The second interface 84 may be configured to connect to the second display apparatus, and in the first display mode, output the second image signal to the second display apparatus.

The first interface may be an interface on the housing of the first display apparatus, which may be connected to the first terminal of the processor. Thus, the image signal sent from the electronic apparatus may be directly transmitted to the processor through the first terminal. Both the first interface and the second interface may be arranged on the housing of the first display apparatus and configured to connect to other apparatuses or devices other than the first display apparatus.

A plurality of first interfaces may be provided. Different first interfaces may support different communication protocols. For example, some first interfaces may support the DP protocol, and some other first interfaces may support the USB Type-C protocol. However, the image signals output by the switch device may be signals of the DP protocol. Therefore, the protocol supported by the image signal output by the switch device may be same or different type as the protocol supported by the first interface.

The display apparatus of embodiments of the present disclosure may support at least two display modes. When other display apparatuses are provided in the application environment, the display apparatus may control different image signals to be displayed on different display apparatuses, respectively. When no other display apparatus is provided in the application environment, and a plurality of image signals may need to be displayed, the display apparatus may divide the display screen of the display apparatus into different display areas, which are configured to display different image signals. Thus, the display control function of the display apparatus may be more complete and have a wider application scope to better satisfy the diverse application needs of the user.

Figure 9:
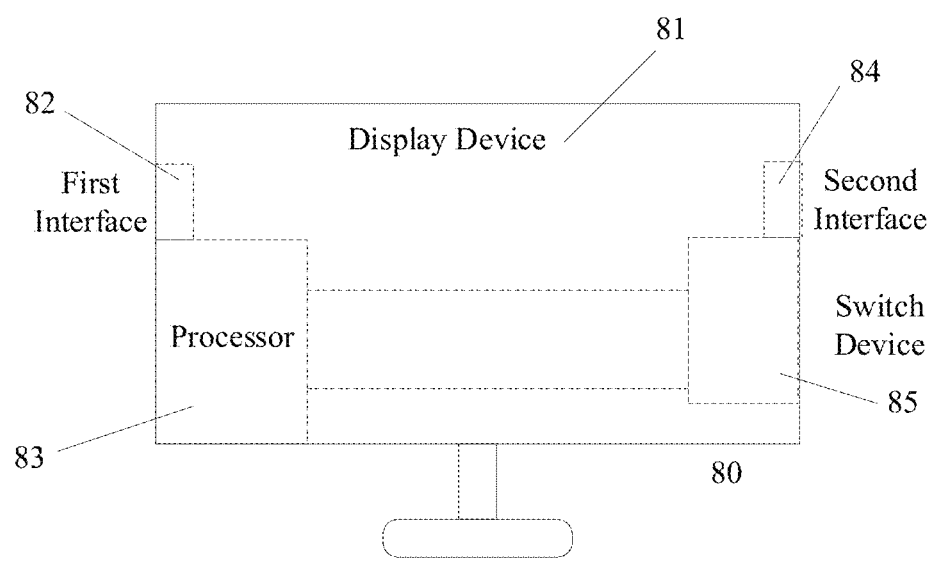
FIG. 9 illustrates a schematic structural diagram of another display apparatus according to embodiments of the present disclosure.

FIG. 9 illustrates a schematic structural diagram of another display apparatus according to embodiments of the present disclosure. With reference to FIG. 9, the display apparatus 80 further includes a switch device 85.

The switch device 85 may be connected to the processor and configured to receive the second image signal sent by the processor. The switch device 85 may be further configured to, when the display apparatus is in the first display mode, transmit the received second image signal to the second interface, and when the display apparatus is in the second display mode, output the received second image signal to the second terminal of the processor.

Figure 10:
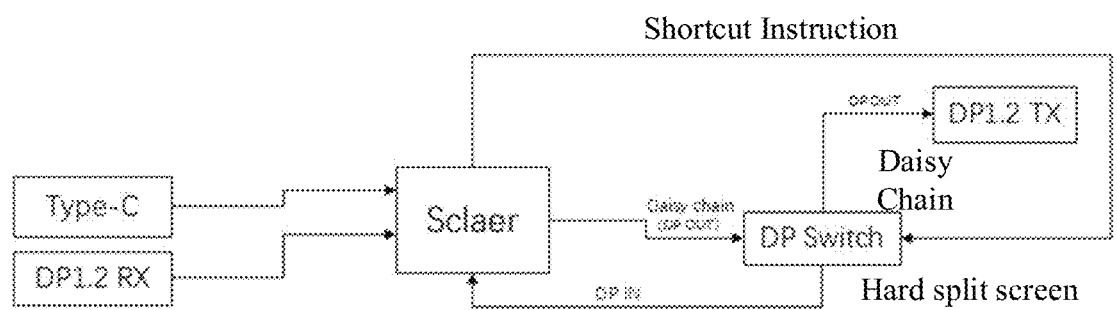
FIG. 10 illustrates a schematic structural diagram showing a hardware wire of a display apparatus according to embodiments of the present disclosure.

FIG. 10 illustrates a schematic structural diagram showing a hardware wire of a display apparatus according to embodiments of the present disclosure. As shown in FIG. 10, in some embodiments, the processor includes a Sclaer chip, and the switch device includes a DP Switch module. In some embodiments, when the Scaler sends an instruction DP OUT, the daisy chain function and the hard split screen function may be realized by controlling the high level and low level of the GPIO of the DP Switch. When the default of the GPIO is predetermined to be the high level, a daisy chain channel may be turned on. Thus, a plurality of monitors may be connected in series with the DP line to realize the daisy chain function. When the hard split screen function is enabled, the GPIO may be changed to the low level, and the daisy chain channel may be closed. Thus, the hard split screen function may be implemented under a DP/USB Type-C signal.

In some embodiments, the processor may further include an input device. The input device may be connected to the processor and configured to collect input information and generate a switch signal based on the input information. Thus, after receiving the switch signal, the processor may control the electronic apparatus to switch from the first display mode to the second display mode or from the second display mode to the first display mode. In some other embodiments, the switch signal may be generated when the processor detects that the second interface is switched from the first connection state to the second connection state. The first connection state and the second connection state may be used to represent whether the second interface is connected to the second display apparatus.

The input device may transmit the switch signal to the switch device. Thus, after receiving the switch signal, the switch device may switch a transmission path for transmitting the second image signal. The transmission path of the second image signal may include a transmission path connecting the second display apparatus and a transmission path connecting the second terminal. As shown in FIG. 10, a signal transmitted by the instruction transmission terminal includes a GPIO high-level signal or a GPIO low-level signal.

For the specific functional implementation of the structural components of the display apparatus above, reference may be made to the content introduction of the corresponding part in method embodiments, which is not repeated here.

The present disclosure may further provide a display control device. The display control device may include a signal acquisition module, a mode determination module, and a display control module.

The signal acquisition module may be configured to obtain an image signal from the electronic apparatus. The image signal may at least include the first image signal and the second image signal. The first image signal may correspond to the first configuration information, and the second image signal may correspond to the second configuration information. The first configuration information and the second configuration information may be used for the electronic apparatus to determine two different display areas.

The mode determination module may be configured to determine a current display mode of the first display apparatus.

The display control module may be configured to control the first image signal to be output and displayed on the first display apparatus corresponding to the first configuration information when the current display mode is the first display mode, and control the second image signal to be output and displayed on the second display apparatus that is connected to the first display apparatus and corresponding to the second configuration information. The display control module may be further configured to control the first image signal and the second image signal to be output and displayed in the two different display areas of the first display apparatus when the current display mode is the second display mode. The two different display areas may correspond to the first configuration information and the second configuration information, respectively.

The display control device of embodiments of the present disclosure may include a processor and a memory. The signal acquisition module, the mode determination module, and the display control module above may be stored in the memory as program modules. The processor may be configured to execute the program modules stored in the memory to implement corresponding functions.

The processor may include a core. The core may be configured to call the corresponding program module from the memory. One or more cores may be provided. Return data processing may be realized by adjusting core parameters.

The memory may include non-persistent memory in a computer-readable medium, random access memory (RAM) and/or non-volatile memory, such as read-only memory (ROM) or flash memory (flash RAM). The memory may include at least one memory chip.

Embodiments of the present disclosure may provide a storage medium used to store a program. When the program is executed by the processor, the processor may be configured to implement the display control method of embodiments of the present disclosure.

Embodiments of the present disclosure may provide the processor. The processor may be configured to run a program. When the program is executed by the processor, the processor may be configured to implement the display control method of embodiments of the present disclosure.

Further, embodiments of the present disclosure may provide an electronic apparatus including a processor and a memory. The memory may be used to store executable instructions of the processor. The processor may be configured to execute executable instructions to execute the display control method of embodiments of the present disclosure.

Embodiments of the present disclosure may be described in a progressive manner. Each embodiment may focus on the differences from other embodiments. The same and similar parts between embodiments may be referred to each other. For the device of embodiments of the present disclosure, since the device corresponds to the method of embodiments of the present disclosure, the description may be relatively simple, and the relevant part may be referred to the description of the method.

In the present disclosure, relational terms such as first and second may be used only to distinguish one entity or operation from another, and may not necessarily require or imply those entities or operations to have such actual relationship or order therebetween. Moreover, the terms "comprising," "including," or any other variation thereof are intended to encompass non-exclusive inclusion such that a process, method, article, or device comprising a series of elements includes not only those elements, but also includes other elements that are not explicitly listed or elements inherent to such a process, method, article, or device. Without further limitation, an element defined by the phrase "including a . . . " does not preclude the presence of additional identical elements in the process, method, article, or device that includes the elements.

The steps of the method or algorithm described in connection with embodiments of the present disclosure may be directly implemented by hardware, a software module executed by the processor, or a combination thereof. The software modules may be stored in random access memory (RAM), internal memory, read-only memory (ROM), electrically programmable ROM, electrically erasable programmable ROM, registers, hard disk, a removable disk, CD-ROM, or any other storage media that is known.

The above description of embodiments of the present disclosure may enable those skilled in the art to implement or use the present disclosure. Various modifications to embodiments of the present disclosure will be apparent to those skilled in the art. The generic principle defined herein may be implemented in other embodiments without departing from the spirit or scope of the present disclosure. Therefore, the present disclosure may not be limited to embodiments of the present disclosure but conform to the widest scope consistent with the principles and novel features of the present disclosure.

What is claimed is:

1. A display control method comprising:
   obtaining an image signal from an electronic apparatus, the image signal including at least a first image signal and a second image signal, the first image signal corresponding to first configuration information, the second image signal corresponding to second configuration information, the first configuration information and the second configuration information each including display identification data, and the first configuration information and the second configuration information being used to enable the electronic apparatus to determine two different display areas;
   determining a current display mode of a first display apparatus;
   when the current display mode is a first display mode, controlling the first image signal to be output and displayed on the first display apparatus corresponding to the first configuration information and controlling the second image signal to be output and displayed on a second display apparatus connected to the first display apparatus and corresponding to the second configuration information; and
   when the current display mode is a second display mode, controlling the first image signal and the second image signal to be output and displayed in the two different display areas of the first display apparatus, respectively, the two different display areas corresponding to the first configuration information and the second configuration information, respectively,
   wherein controlling the first image signal and the second image signal to be output and displayed in the two different display areas of the first display apparatus, respectively, includes:
      obtaining, by a processor, the first image signal and the second image signal through a first interface;
      transmitting, by the processor, the second image signal to a switch device;
      obtaining, by the processor, the second image signal output by the switch device to the processor; and
      controlling, by the processor, the first image signal to be output and displayed in the first display area of the first display apparatus and the second image signal to be output and displayed in the second display area of the first display apparatus.

2. The display control method according to claim 1, wherein:
   before entering the first display mode, the first display apparatus transmits the first configuration information and the second configuration information of the second display apparatus connected to the first display apparatus to the electronic apparatus, the first configuration information including display parameter information of the first display apparatus, and the second configuration information including display parameter information of the second display apparatus; and
   before entering the second display mode, the first display apparatus generates the first configuration information and the second configuration information and transmits the first configuration information and the second configuration information to the electronic apparatus, the first configuration information including display parameter information of a first display area of the first display apparatus, and the second configuration information including display parameter information of a second display area of the first display apparatus.

3. The display control method according to claim 1, wherein:
   the image signal further includes a third image signal; and
   the method further comprises:
      when the current display mode is a third display mode, controlling the first image signal and the second image signal to be output and displayed in the two different display areas of the first display apparatus, respectively, and controlling the third image signal to be output and displayed on the second display apparatus, including;
         obtaining, by the processor, the first image signal, the second image signal, and the third image signal through the first interface;
         transmitting, by the processor, the second image signal and the third image signal to the switch device;
         obtaining, by the processor, the second image signal output by the switch device to the processor;
         controlling, by the processor, the switch device to transmit the third image signal to the second display apparatus for output and display; and
         controlling, by the processor, the first image signal to be output and displayed in the first display area of the first display apparatus and the second image signal to be output and displayed in the second display area of the first display apparatus.

4. The display control method according to claim 1, further comprising:
   receiving a switch signal; and
   controlling the first display apparatus to switch from the first display mode to the second display mode based on the switch signal or to switch from the second display mode to the first display mode, the switch signal being generated by an input device of the first display apparatus or automatically generated by the first display apparatus in response to detecting a first condition.

5. The display control method according to claim 4, further comprising:
   in response to the first display apparatus being in the second display mode, and detecting that the second display apparatus is connected, determining the first condition is satisfied and controlling the first display apparatus to be switched from the second display mode to the first display mode, including:
      controlling, by the processor, the first image signal to be output and displayed on the first display apparatus; and
      transmitting, by the processor, the second image signal to the switch device to cause the switch device to transmit the second image signal to the second display apparatus for output and display; or
   in response to the first display apparatus being in the first display mode and detecting that the second display apparatus is disconnected, determining that the first condition is satisfied and controlling the first display apparatus to be switched from the first display mode to the second display mode.

6. The display control method according to claim 4, wherein:
the first image signal is parsed into a first image;
the second image signal is parsed into a second image; and
generating, by the input device of the first display apparatus, the switch signal includes:
displaying a fourth image on the first display apparatus; and
generating the switch signal based on a selection signal of the input device for a content displayed in the fourth image;
wherein:
the first image and the second image are obtained by the first display apparatus parsing the received first image signal and the second image signal;
the fourth image is generated by the first display apparatus locally;
a second manner of outputting the fourth image is different from a first manner of outputting the first image and the second image; and
the second manner has a display priority higher than the first manner.

7. The display control method according to claim 1, wherein each of the first configuration information and the second configuration information includes at least one of a resolution, or a refresh rate.

8. A display apparatus comprising:
a memory storing a program; and
a processor coupled to the memory, wherein when the program is executed by the processor, the processor is configured to:
obtain an image signal from an electronic apparatus, the image signal including at least a first image signal and a second image signal, the first image signal corresponding to first configuration information, the second image signal corresponding to second configuration information, the first configuration information and the second configuration information each including display identification data, and the first configuration information and the second configuration information being used to enable the electronic apparatus to determine two different display areas;
determine a current display mode of a first display apparatus;
in response to the current display mode being a first display mode, control the first image signal to be output and displayed on the first display apparatus corresponding to the first configuration information and control the second image signal to be output and displayed on a second display apparatus connected to the first display apparatus and corresponding to the second configuration information; and
in response to the current display mode being a second display mode, control the first image signal and the second image signal to be output and displayed in the two different display areas of the first display apparatus, respectively, the two different display areas corresponding to the first configuration information and the second configuration information, respectively, including:
obtaining, by the processor, the first image signal and the second image signal through a first interface;
transmitting, by the processor, the second image signal to a switch device;
obtaining, by the processor, the second image signal output by the switch device to the processor; and
controlling, by the processor, the first image signal to be output and displayed in the first display area of the first display apparatus and the second image signal to be output and displayed in the second display area of the first display apparatus.

9. The display apparatus according to claim 8, wherein:
before entering the first display mode, the first display apparatus transmits the first configuration information and the second configuration information of the second display apparatus connected to the first display apparatus to the electronic apparatus, the first configuration information including display parameter information of the first display apparatus, and the second configuration information including display parameter information of the second display apparatus; and
before entering the second display mode, the first display apparatus generates the first configuration information and the second configuration information and transmits the first configuration information and the second configuration information to the electronic apparatus, the first configuration information including display parameter information of a first display area of the first display apparatus, and the second configuration information including display parameter information of a second display area of the first display apparatus.

10. The display apparatus according to claim 8, wherein:
the image signal further includes a third image signal; and
the processor is further configured to:
in response to the current display mode being a third display mode, control the first image signal and the second image signal to be output and displayed in the two different display areas of the first display apparatus, respectively, and control the third image signal to be output and displayed on the second display apparatus, including:
obtaining, by the processor, the first image signal, the second image signal, and the third image signal through a first interface;
transmitting, by the processor, the second image signal and the third image signal to the switch device;
obtaining, by the processor, the second image signal output by the switch device to the processor;
controlling, by the processor, the switch device to transmit the third image signal to the second display apparatus for output and display; and
controlling, by the processor, the first image signal to be output and displayed in the first display area of the first display apparatus and the second image signal to be output and displayed in the second display area of the first display apparatus.

11. The display apparatus according to claim 8, wherein the processor is further configured to:
receive a switch signal; and
control the first display apparatus to switch from the first display mode to the second display mode based on the switch signal or to switch from the second display mode to the first display mode, the switch signal being generated by an input device of the first display apparatus or automatically generated by the first display apparatus in response to detecting a first condition.

12. The display apparatus according to claim 11, wherein the processor is further configured to:

in response to the first display apparatus being in the second display mode, and detecting that the second display apparatus is connected, determine that the first condition is satisfied and control the first display apparatus to be switched from the second display mode to the first display mode, including:
controlling, by the processor, the first image signal to be output and displayed on the first display apparatus; and
transmitting, by the processor, the second image signal to the switch device to cause the switch device to transmit the second image signal to the second display apparatus for output and display; or
in response to the first display apparatus being in the first display mode and detecting that the second display apparatus is disconnected, determine that the first condition is satisfied and control the first display apparatus to be switched from the first display mode to the second display mode.

13. The display apparatus according to claim 11, wherein:
the first image signal is parsed into a first image;
the second image signal is parsed into a second image; and
the processor is further configured to:
display a fourth image on the first display apparatus; and
generate the switch signal based on a selection signal of the input device for a content displayed in the fourth image;
wherein:
the first image and the second image are obtained by the first display apparatus parsing the received first image signal and the second image signal;
the fourth image is generated by the first display apparatus locally;
a second manner of outputting the fourth image is different from a first manner of outputting the first image and the second image; and
the second manner has a display priority higher than the first manner.

14. A non-transitory computer-readable storage medium storing a program that, when the program is executed by a processor, causes the processor to:
obtain an image signal from an electronic apparatus, the image signal including at least a first image signal and a second image signal, the first image signal corresponding to first configuration information, the second image signal corresponding to second configuration information, the first configuration information and the second configuration information each including display identification data, and the first configuration information and the second configuration information being used to enable the electronic apparatus to determine two different display areas;
determine a current display mode of a first display apparatus;
in response to the current display mode being a first display mode, control the first image signal to be output and displayed on the first display apparatus corresponding to the first configuration information and control the second image signal to be output and displayed on a second display apparatus connected to the first display apparatus and corresponding to the second configuration information; and
in response to the current display mode being a second display mode, control the first image signal and the second image signal to be output and displayed in the two different display areas of the first display apparatus, respectively, the two different display areas corresponding to the first configuration information and the second configuration information, respectively, including:
obtaining, by the processor, the first image signal and the second image signal through a first interface;
transmitting, by the processor, the second image signal to a switch device;
obtaining, by the processor, the second image signal output by the switch device to the processor; and
controlling, by the processor, the first image signal to be output and displayed in the first display area of the first display apparatus and the second image signal to be output and displayed in the second display area of the first display apparatus.

15. The non-transitory computer-readable storage medium according to claim 14, wherein:
before entering the first display mode, the first display apparatus transmits the first configuration information and the second configuration information of the second display apparatus connected to the first display apparatus to the electronic apparatus, the first configuration information including display parameter information of the first display apparatus, and the second configuration information including display parameter information of the second display apparatus; and
before entering the second display mode, the first display apparatus generates the first configuration information and the second configuration information and transmits the first configuration information and the second configuration information to the electronic apparatus, the first configuration information including display parameter information of a first display area of the first display apparatus, and the second configuration information including display parameter information of a second display area of the first display apparatus.

16. The non-transitory computer-readable storage medium according to claim 14, wherein:
the image signal further includes a third image signal; and
the program further causes the processor to:
in response to the current display mode being a third display mode, control the first image signal and the second image signal to be output and displayed in two different display areas of the first display apparatus, respectively, and control the third image signal to be output and displayed on the second display apparatus, including:
obtaining, by the processor, the first image signal, the second image signal, and the third image signal through the first interface;
transmitting, by the processor, the second image signal and the third image signal to the switch device;
obtaining, by the processor, the second image signal output by the switch device to the processor;
controlling, by the processor, the switch device to transmit the third image signal to the second display apparatus for output and display; and
controlling, by the processor, the first image signal to be output and displayed in the first display area of the first display apparatus and the second image signal to be output and displayed in the second display area of the first display apparatus.

17. The non-transitory computer-readable storage medium according to claim 14, wherein the program further causes the processor to:

receive a switch signal; and control the first display apparatus to switch from the first display mode to the second display mode based on the switch signal or to switch from the second display mode to the first display mode, the switch signal being generated by an input device of the first display apparatus or automatically generated by the first display apparatus in response to detecting a first condition.

18. The non-transitory computer-readable storage medium according to claim 14, wherein the program further causes the processor to:

receive a switch signal; and control the first display apparatus to switch from the first display mode to the second display mode based on the switch signal or to switch from the second display mode to the first display mode, the switch signal being generated by an input device of the first display apparatus or automatically generated by the first display apparatus in response to detecting a first condition.

19. The non-transitory computer-readable storage medium according to claim 18, wherein the program further causes the processor to:

in response to the first display apparatus being in the second display mode, and detecting that the second display apparatus is connected, determine the first condition is satisfied and control the first display apparatus to be switched from the second display mode to the first display mode, including:

controlling, by the processor, the first image signal to be output and displayed on the first display apparatus; and transmitting, by the processor, the second image signal to the switch device to cause the switch device to transmit the second image signal to the second display apparatus for output and display; or in response to the first display apparatus being in the first display mode and detecting that the second display apparatus is disconnected, determine that the first condition is satisfied and controlling the first display apparatus to be switched from the first display mode to the second display mode.

20. The non-transitory computer-readable storage medium according to claim 18, wherein:

the first image signal is parsed into a first image;

the second image signal is parsed into a second image; and generating, by the input device of the first display apparatus, the switch signal includes:

displaying a fourth image on the first display apparatus; and generating the switch signal based on a selection signal of the input device for a content displayed in the fourth image;

wherein:

the first image and the second image are obtained by the first display apparatus parsing the received first image signal and the second image signal;

the fourth image is generated by the first display apparatus locally;

a second manner of outputting the fourth image is different from a first manner of outputting the first image and the second image; and the second manner has a display priority higher than the first manner.

\* \* \* \* \*